US012695628B2

(12) United States Patent
Kawai

(10) Patent No.: US 12,695,628 B2
(45) Date of Patent: Jul. 28, 2026

(54) ISSUANCE SYSTEM AND CERTIFICATE ISSUANCE SERVER

(71) Applicant: Mitsubishi Electric Corporation, Tokyo (JP)

(72) Inventor: Yumiko Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 19/109,970

(22) PCT Filed: Nov. 10, 2022

(86) PCT No.: PCT/JP2022/041897
§ 371 (c)(1),
(2) Date: Mar. 7, 2025

(87) PCT Pub. No.: WO2024/100835
PCT Pub. Date: May 16, 2024

(65) Prior Publication Data
US 2026/0081793 A1 Mar. 19, 2026

(51) Int. Cl.
*H04L 9/32* (2006.01)

(52) U.S. Cl.
CPC .......... *H04L 9/3268* (2013.01); *H04L 9/3297* (2013.01)

(58) Field of Classification Search
CPC ... H04L 9/3265; H04L 9/0816; H04L 9/3268; H04L 9/321; H04L 9/3236; H04L 9/3247; H04W 12/069
See application file for complete search history.

(56) References Cited

U.S. PATENT DOCUMENTS 9,130,758 B2 * 9/2015 Fu ........................ H04L 63/0823
2024/0323027 A1 * 9/2024 Kumar .............. H04W 12/0431

FOREIGN PATENT DOCUMENTS

JP          2020-177376 A     10/2020
JP          6907111 B          7/2021
KR          20210103384 A  *  8/2021  ......... H04L 63/0428

OTHER PUBLICATIONS

Patent Cooperation Treaty, International Search Report, Application No. PCT/JP2022/041897, dated Jan. 24, 2023, in 4 pages.

* cited by examiner

*Primary Examiner* — Brian F Shaw
(74) *Attorney, Agent, or Firm* — PROCOPIO, CORY, HARGREAVES & SAVITCH LLP

(57) ABSTRACT

A certificate issuance server includes a storage unit that stores a preshared key, a communication unit that receives a signature and a time stamp transmitted by an information processing device, a verification unit that verifies the signature by using a public key corresponding to a secret key and verifies the time stamp, and an issuance unit that issues an electronic certificate when it is certified that the preshared key had been stored in the information processing device and it is certified that the signature was generated in a term of validity of an electronic certificate. The signature is generated in the term of validity based on the secret key and the preshared key. The time stamp is information certifying timing of the generation of the signature. Upon issuance of the electronic certificate, the communication unit transmits the issued electronic certificate to the information processing device.

5 Claims, 5 Drawing Sheets

ISSUANCE SYSTEM AND CERTIFICATE ISSUANCE SERVER

CROSS-REFERENCE TO RELATED APPLICATIONS

This application is a US National Stage of International Patent Application PCT/JP2022/041897, filed on Nov. 10, 2022, the contents of which are incorporated herein by reference.

TECHNICAL FIELD

The present disclosure relates to an issuance system and a certificate issuance server.

BACKGROUND ART

When client authentication is performed by Secure Sockets Layer (SSL)/Transport Layer Security (TLS) communication, a client certificate as an electronic certificate of a client device is used. A term of validity has been set in the client certificate. When the term of validity expires, the client certificate becomes invalid. When the client certificate has become invalid, reissuance of the client certificate is necessary. Further, if it is within the term of validity, the term of validity of the client certificate can be updated based on the scheme of SSL/TLS. Incidentally, when the term of validity has expired, it is impossible to update the term of validity of the client certificate based on the scheme of SSL/TLS.

Here, a technology regarding the electronic certificate has been proposed (see Patent Reference 1). Equipment in the Patent Reference 1 decrypts an encrypted second certificate after an expiration date/time of the term of validity of a first certificate. The first certificate and the second certificate are electronic certificates that certify the equipment.

Prior Art Reference

Patent Reference

Patent Reference 1: Japanese Patent No. 6907111

SUMMARY OF THE INVENTION

Problem to Be Solved by the Invention

Incidentally, when the electronic certificate is reissued, password authentication is performed in order to authenticate the device. In the password authentication, a user inputs a password. Thus, in the reissuance of the electronic certificate, the load on the user is heavy.

An object of the present disclosure is to reduce the load on the user.

Means for Solving the Problem

An issuance system according to an aspect of the present disclosure is provided. The issuance system includes an information processing device that communicates with a time stamp server and stores an electronic certificate, a secret key having a relationship with the electronic certificate, and a preshared key and a certificate issuance server that stores the preshared key. The information processing device generates a signature based on the secret key and the preshared key in a term of validity of the electronic certificate, transmits a command for generating a time stamp to the time stamp server, and receives the time stamp from the time stamp server, and transmits the signature and the time stamp to the certificate issuance server after expiration of the term of validity. The certificate issuance server verifies the signature by using a public key corresponding to the secret key and verifies the time stamp, and when it is certified that the preshared key had been stored in the information processing device and it is certified that the signature was generated in the term of validity, issues an electronic certificate and transmits the issued electronic certificate to the information processing device.

Effect of the Invention

According to the present disclosure, the load on the user can be reduced.

MODE FOR CARRYING OUT THE INVENTION

Embodiments will be described below with reference to the drawings. The following embodiments are just examples and a variety of modifications are possible within the scope of the present disclosure.

First Embodiment

Figure 1:
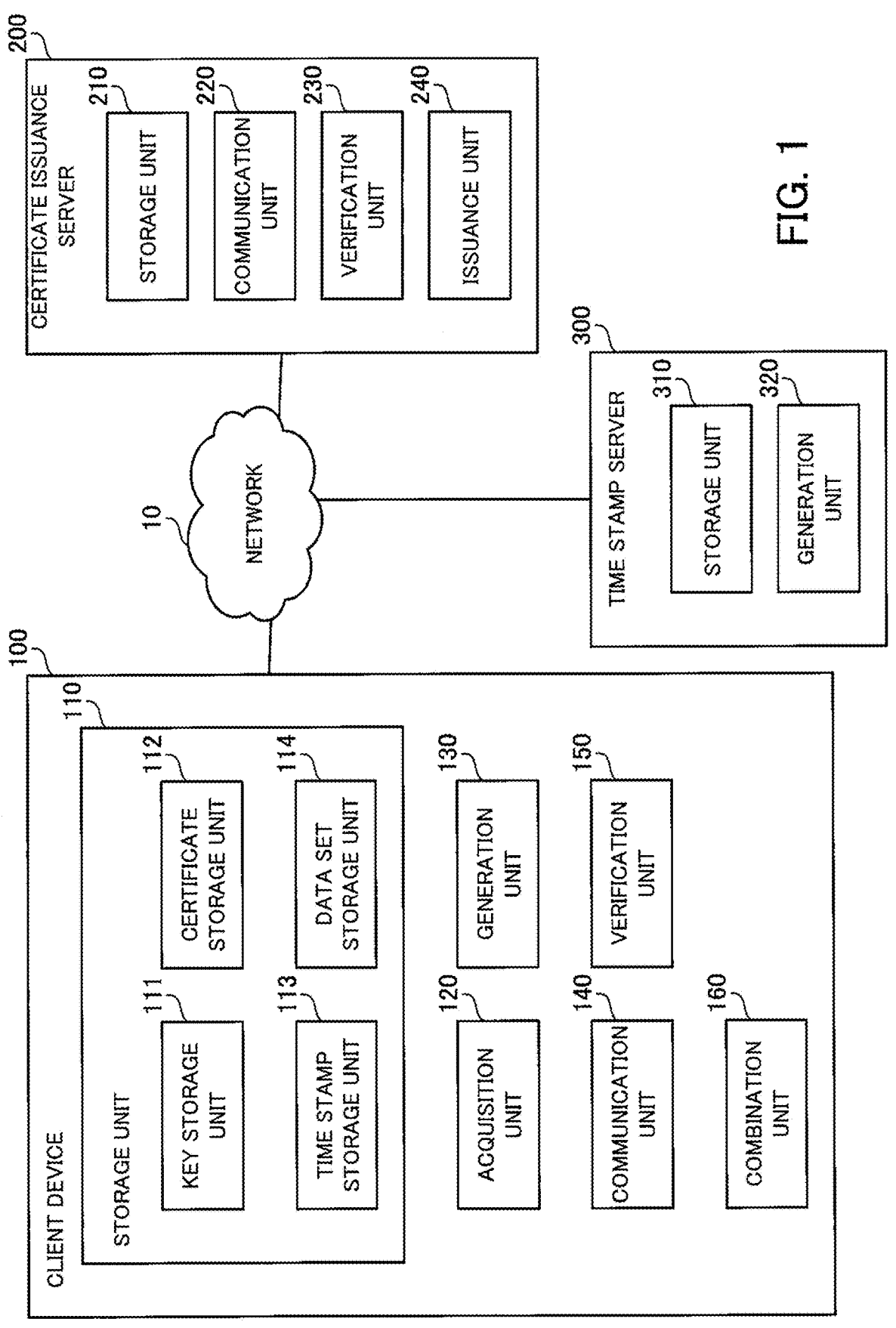
FIG. 1 is a diagram showing an issuance system in a first embodiment.

FIG. 1 is a diagram showing an issuance system in a first embodiment. The issuance system includes a client device 100, a certificate issuance server 200 and a time stamp server 300. The client device 100, the certificate issuance server 200 and the time stamp server 300 execute communication via a network 10.

The client device 100 may be represented also as an information processing device. The client device 100 may exist at a remote location geographically distant from the certificate issuance server 200. FIG. 1 shows a case where one client device and one certificate issuance server are connected to each other. The certificate issuance server 200 may be connected to a plurality of client devices. The structure of the network between the certificate issuance server 200 and the plurality of client devices is not particularly limited.

The certificate issuance server 200 is a server that issues a client certificate. A CA certificate and a route certificate signed by a third-party server placed outside may exist at a level above the electronic certificate.

The time stamp server 300 is a server that generates time stamps.

Next, hardware included in the client device 100 will be described below.

Figure 2:
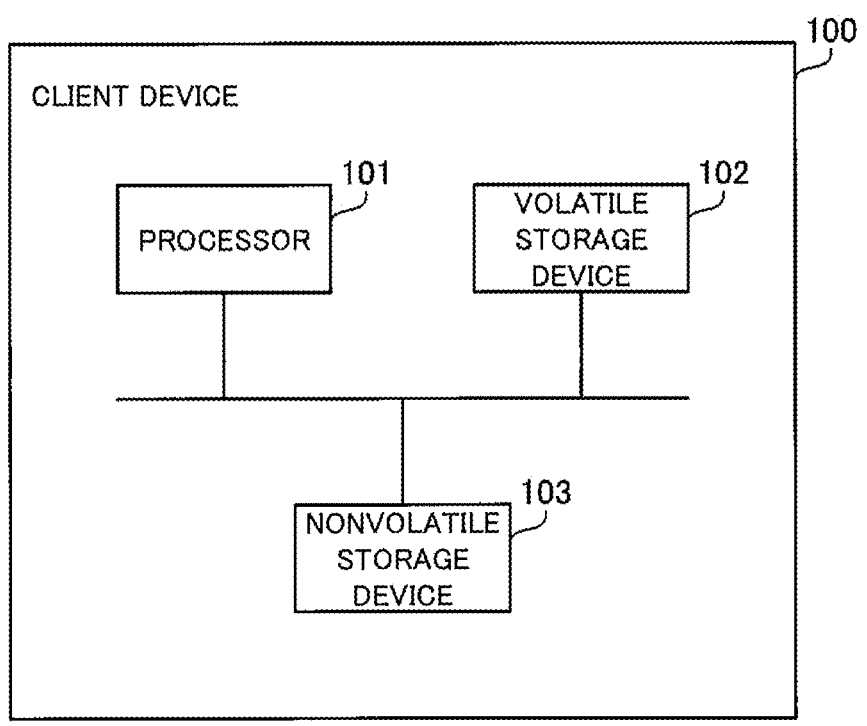
FIG. 2 is a diagram showing hardware included in a client device in the first embodiment.

FIG. 2 is a diagram showing hardware included in the client device in the first embodiment. The client device 100 includes a processor 101, a volatile storage device 102 and a nonvolatile storage device 103.

The processor 101 controls the whole of the client device 100. The processor 101 is a Central Processing Unit (CPU), a Field Programmable Gate Array (FPGA) or the like, for example. The processor 101 can also be a multiprocessor. Further, the client device 100 may include processing circuitry.

The volatile storage device 102 is main storage of the client device 100. The volatile storage device 102 is a Random Access Memory (RAM), for example. The nonvolatile storage device 103 is auxiliary storage of the client device 100. The nonvolatile storage device 103 is a Hard Disk Drive (HDD) or a Solid State Drive (SSD), for example.

Each of the certificate issuance server 200 and the time stamp server 300 includes a processor, a volatile storage device and a nonvolatile storage device similarly to the client device 100. Each of the certificate issuance server 200 and the time stamp server 300 may include processing circuitry.

Returning to FIG. 1, functions included in the client device 100, the certificate issuance server 200 and the time stamp server 300 will be described below.

The client device 100 includes a storage unit 110, an acquisition unit 120, a generation unit 130, a communication unit 140, a verification unit 150 and a combination unit 160.

The storage unit 110 may be implemented as a storage area reserved in the volatile storage device 102 or the nonvolatile storage device 103.

Part or all of the acquisition unit 120, the generation unit 130, the communication unit 140, the verification unit 150 and the combination unit 160 may be implemented by processing circuitry. Further, part or all of the acquisition unit 120, the generation unit 130, the communication unit 140, the verification unit 150 and the combination unit 160 may be implemented as modules of a program executed by the processor 101.

The storage unit 110 includes a key storage unit 111, a certificate storage unit 112, a time stamp storage unit 113 and a data set storage unit 114. The key storage unit 111 stores a client secret key. Information stored in the certificate storage unit 112, the time stamp storage unit 113 and the data set storage unit 114 will be described later.

Functions of the acquisition unit 120, the generation unit 130, the communication unit 140, the verification unit 150 and the combination unit 160 will be described later in detail.

The certificate issuance server 200 includes a storage unit 210, a communication unit 220, a verification unit 230 and an issuance unit 240.

The storage unit 210 may be implemented as a storage area reserved in a volatile storage device or a nonvolatile storage device included in the certificate issuance server 200.

Part or all of the communication unit 220, the verification unit 230 and the issuance unit 240 may be implemented by processing circuitry included in the certificate issuance server 200. Further, part or all of the communication unit 220, the verification unit 230 and the issuance unit 240 may be implemented as modules of a program executed by a processor included in the certificate issuance server 200.

Information stored in the storage unit 210 will be described later. Functions of the communication unit 220, the verification unit 230 and the issuance unit 240 will be described later in detail.

The time stamp server 300 includes a storage unit 310 and a generation unit 320.

The storage unit 310 may be implemented as a storage area reserved in a volatile storage device or a nonvolatile storage device included in the time stamp server 300.

Part or the whole of the generation unit 320 may be implemented by processing circuitry included in the time stamp server 300. Further, part or the whole of the generation unit 320 may be implemented as modules of a program executed by a processor included in the time stamp server 300.

The storage unit 310 may store a secret key. Functions of the generation unit 320 will be described later in detail.

Next, a process executed by the issuance system will be described below by using sequence diagrams.

Figure 3:
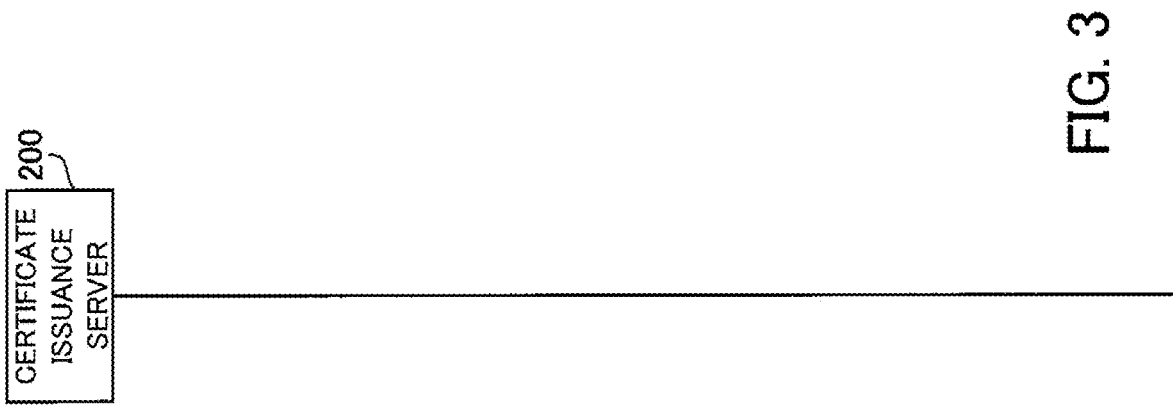
FIG. 3 is a sequence diagram (part 1) showing an example of a process executed by the issuance system in the first embodiment.
Figure 3:
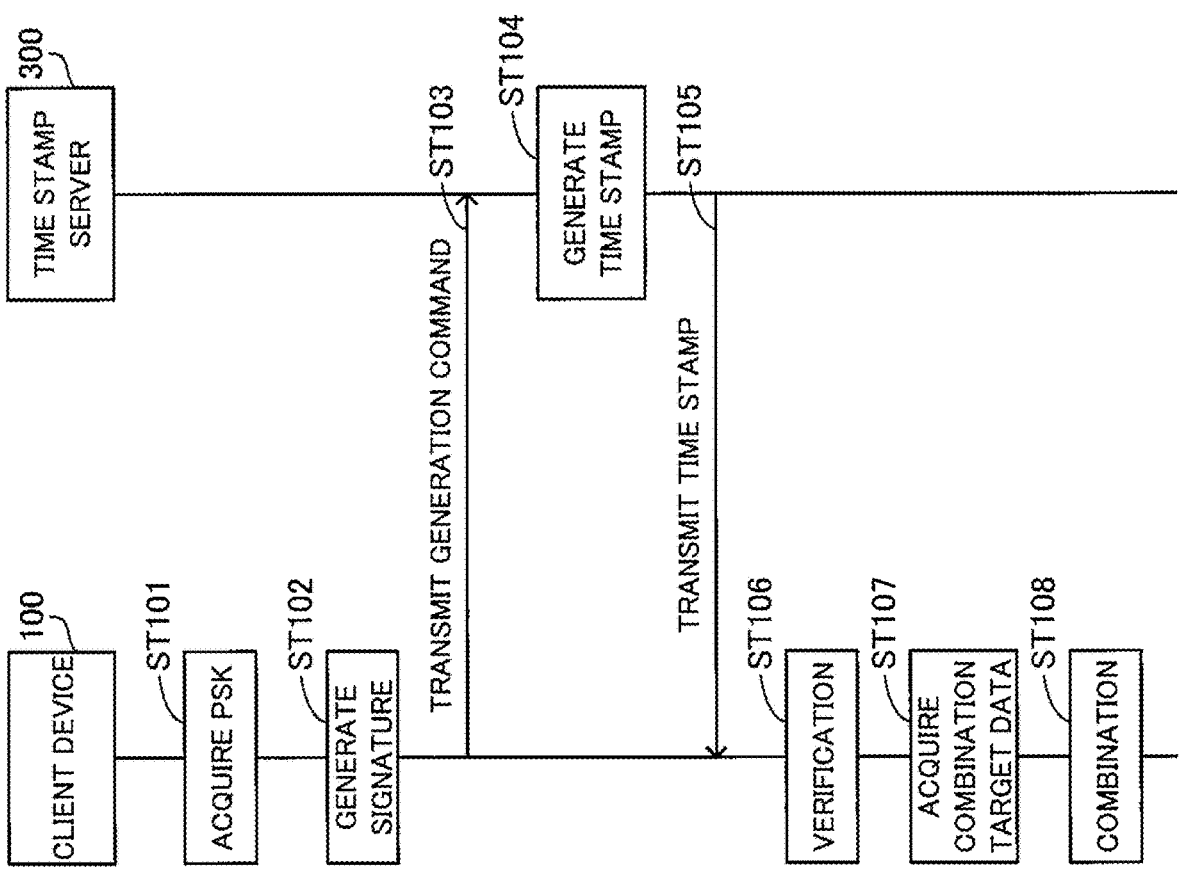

FIG. 3 is a sequence diagram (part 1) showing an example of the process executed by the issuance system in the first embodiment.

The key storage unit 111 of the client device 100 and the storage unit 210 of the certificate issuance server 200 store the same secret key. For example, the secret key is stored in the key storage unit 111 and the storage unit 210 at the time of shipment of the client device 100. As above, the secret key is stored in the client device 100 and the certificate issuance server 200 before subsequent processing is executed. Therefore, the secret key is referred to as a preshared key (PSK: PreShared Key). Further, the secret key may be stored in a storage device such as a dongle.

Furthermore, the certificate storage unit 112 stores a client certificate that is in the term of validity. That is, the certificate storage unit 112 stores a client certificate whose term of validity has not expired. The client certificate may be stored in a storage device such as a dongle.

(Step ST101) The acquisition unit 120 of the client device 100 acquires the PSK as signature target data.

(Step ST102) The generation unit 130 of the client device 100 generates a signature based on the client secret key and the signature target data. In more detail, the generation unit 130 calculates a hash value by using the signature target data and a hash function. The generation unit 130 encrypts the hash value by using the client secret key. By this, an encrypted hash value is generated as the signature. Here, the client secret key may be represented also as a secret key having a relationship with the client certificate.

Incidentally, validity of the signature can be confirmed by using a client public key corresponding to the client secret key.

(Step ST103) The communication unit 140 of the client device 100 transmits a generation command of a time stamp to the time stamp server 300. Further, when transmitting the generation command, the communication unit 140 transmits the hash value or the signature to the time stamp server 300.

(Step ST104) The generation unit 320 of the time stamp server 300 generates a time stamp based on the generation command. For example, the generation unit 320 generates the time stamp based on time information and the hash value or the signature.

(Step ST105) The time stamp server 300 transmits the time stamp to the client device 100.

(Step ST106) The communication unit 140 of the client device 100 receives the time stamp from the time stamp server 300.

The verification unit 150 of the client device 100 verifies the validity of the time stamp. For example, the verification unit 150 compares a hash value corresponding to the time stamp with the hash value calculated in the step ST102. If the hash values coincide with each other, the validity of the time stamp is confirmed. When the validity has been confirmed, the verification unit 150 stores the time stamp in the time stamp storage unit 113. Incidentally, the time stamp may be represented also as information certifying the timing of the generation of the signature.

Further, when the validity has been confirmed, the verification unit 150 deletes the PSK. Since the client device 100 deletes the PSK on its own as above, the risk of leakage of the PSK is reduced. Further, a management cost in the issuance system is reduced.

(Step ST107) The acquisition unit 120 of the client device 100 acquires combination target data. The combination target data is data that can be disclosed. For example, the combination target data is time information.

(Step ST108) The combination unit 160 of the client device 100 combines the combination target data and the signature together. By this, the client device 100 can obtain one set including the combination target data and the signature. The combination unit 160 stores the set in the data set storage unit 114.

The client device 100 and the time stamp server 300 repeat the steps ST102 to ST108. Incidentally, the signature target data used in the step ST102 executed subsequently to the step ST108 is the combination target data acquired in the step ST107. Further, the steps ST101 to ST108 are executed in the term of validity of the client certificate.

By this processing, the client device 100 can obtain a plurality of combinations (i.e., a plurality of sets) and a plurality of time stamps. In other words, the client device 100 can obtain a combination of a plurality of pieces of combination target data and a plurality of signatures, and a plurality of time stamps.

Figure 4:
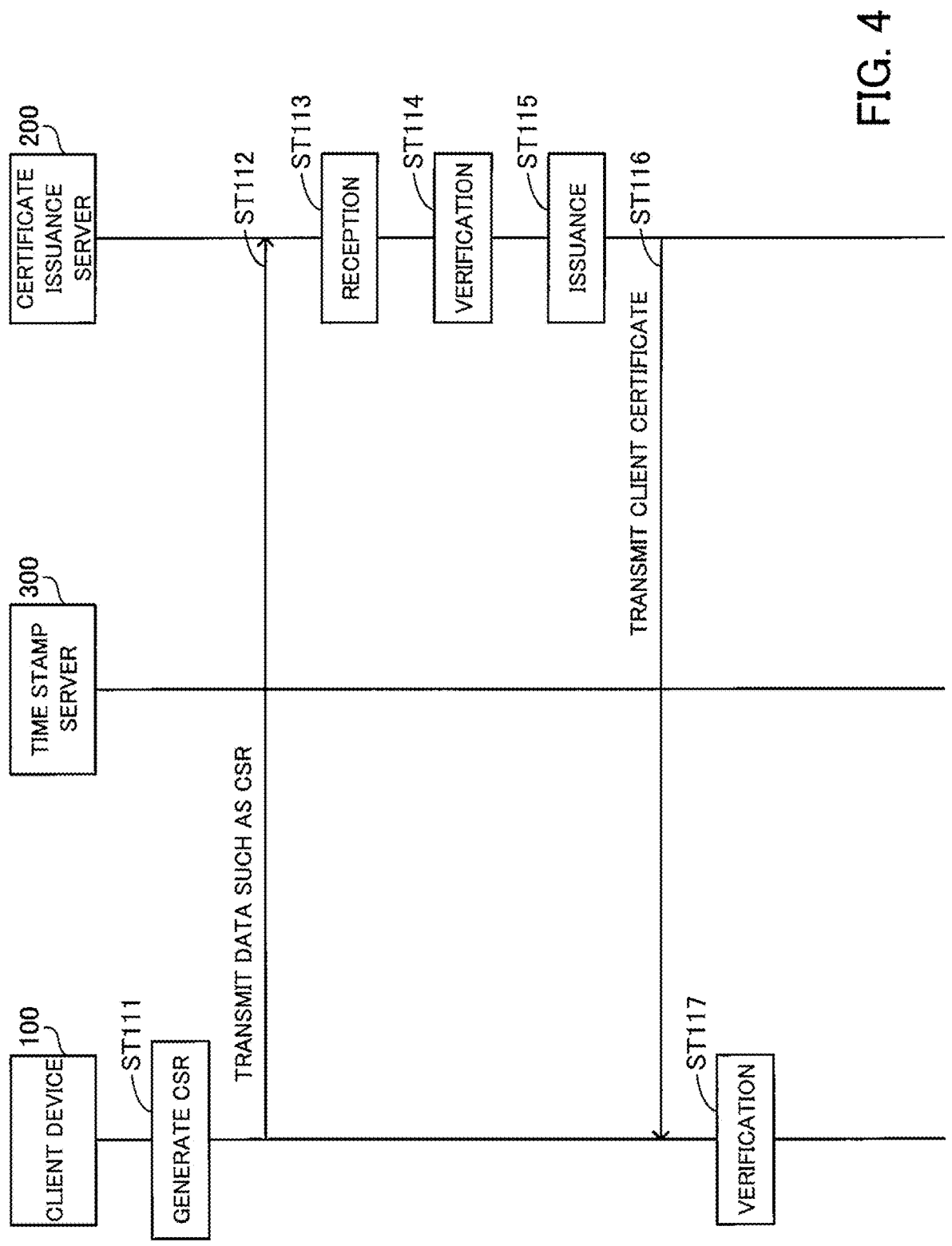
FIG. 4 is a sequence diagram (part 2) showing the example of the process executed by the issuance system in the first embodiment.

FIG. 4 is a sequence diagram (part 2) showing the example of the process executed by the issuance system in the first embodiment.

(Step ST111) The generation unit 130 of the client device 100 generates a Certificate Signing Request (CSR) after the expiration of the term of validity of the client certificate.

(Step ST112) The communication unit 140 of the client device 100 transmits the CSR, the plurality of combinations (i.e., the plurality of sets) and the plurality of time stamps to the certificate issuance server 200.

(Step ST113) The communication unit 220 of the certificate issuance server 200 receives the CSR, the plurality of combinations and the plurality of time stamps.

(Step ST114) The verification unit 230 of the certificate issuance server 200 verifies the plurality of signatures included in the plurality of combinations. The verification will be described below in detail. First, the verification of the signature generated first will be described below. The verification unit 230 calculates a hash value by using a hash function and the PSK stored in the storage unit 210. The verification unit 230 decrypts the signature by using the client public key. By this, the certificate issuance server 200 can obtain a hash value. The verification unit 230 compares the calculated hash value with the hash value obtained by the decryption. If the hash values coincide with each other, the validity is confirmed.

Incidentally, the client public key is a public key corresponding to the client secret key. The client public key may be stored in the storage unit 210. The client public key may be stored in an external device. In the case where the client public key is stored in an external device, the verification unit 230 acquires the client public key from the external device and uses the client public key.

Subsequently, signatures other than the signature generated first are verified by the following method. The verification unit 230 calculates a hash value by using a hash function and the combination target data associated with the already-verified signature. The verification unit 230 decrypts the signature generated subsequently to the already-verified signature by using the client public key. By this, the certificate issuance server 200 can obtain a hash value. The verification unit 230 compares the calculated hash value with the hash value obtained by the decryption. If the hash values coincide with each other, the validity is confirmed.

By this method, the verification unit 230 can verify a plurality of signatures. Here, by the verification of the signature generated first, it is certified that a PSK the same as the PSK stored in the certificate issuance server 200 had been stored in the client device 100. Further, the client secret key is used for the signature. The generation of the signature is performed in the term of validity of the client certificate. Therefore, it is certified that the client secret key corresponding to the client certificate in the term of validity had been stored in the client device 100 in the period in which the signature is generated.

The verification unit 230 verifies the plurality of time stamps in regard to the term of validity. The method of verifying the time stamps is the same as that in the step ST106. Thus, repeated description of the method is left out. As above, by the verification of the time stamp, it is certified that the signature was generated in the term of validity.

Simply put, the verification by the verification unit 230 is identity confirmation of the client device 100 as the destination of the issuance of the client certificate as will be described later.

(Step ST115) When it is certified that the PSK had been stored in the client device 100 and it is certified that the signature was generated in the term of validity, the issuance unit 240 of the certificate issuance server 200 issues a client certificate with a signature. Incidentally, this signature is generated by using a server secret key stored in the storage unit 210.

(Step ST116) The communication unit 220 of the certificate issuance server 200 transmits the client certificate with the signature to the client device 100.

(Step ST117) The verification unit 150 of the client device 100 verifies the signature by using a server public key. When the verification is completed, the verification unit 150 stores the client certificate in the certificate storage unit 112. Further, the verification unit 150 deletes the old client certificate.

Further, the certificate issuance server 200 before performing the verification may determine whether the term of validity of the client certificate has expired or not. Then, if the term of validity has expired, the certificate issuance server 200 performs the verification.

In the step ST112, the description has given of the case where the CSR, the plurality of combinations and the plurality of time stamps are transmitted. Depending on the timing, there are cases where the steps ST101 to ST108 are not repeated. When the repeating does not occur, the communication unit 140 of the client device 100 transmits the CSR, one combination (i.e., one set) and one time stamp to the certificate issuance server 200.

Further, in the step ST112, the description has given of the case where the data such as the CSR are transmitted after the expiration of the term of validity of the client certificate. The communication unit 140 of the client device 100 may also transmit the data such as the CSR before the expiration of the term of validity.

In the step ST115, the description has given of the case where the client certificate with the signature is issued. It is permissible even if the client certificate with no signature added thereto is issued.

According to the first embodiment, when reissuing an electronic certificate, the issuance system issues the electronic certificate automatically. That is, in the issuance system, the password authentication is not performed. Therefore, the user does not input the password. Accordingly, the issuance system is capable of reducing the load on the user.

Second Embodiment

Next, a second embodiment will be described below. In the second embodiment, the description will be given mainly of features different from those in the first embodiment. In the second embodiment, the description is omitted for features in common with the first embodiment.

In the first embodiment, a plurality of time stamps is stored in the client device 100. Then, the client device 100 transmits all the time stamps to the certificate issuance server 200. Since all the time stamps are transmitted as above, data transmission traffic is high. Further, since all the time stamps are transmitted, the load of the verification process od the time stamp on the certificate issuance server 200 is heavy. Therefore, the number of time stamps is reduced in the second embodiment.

Figure 5:
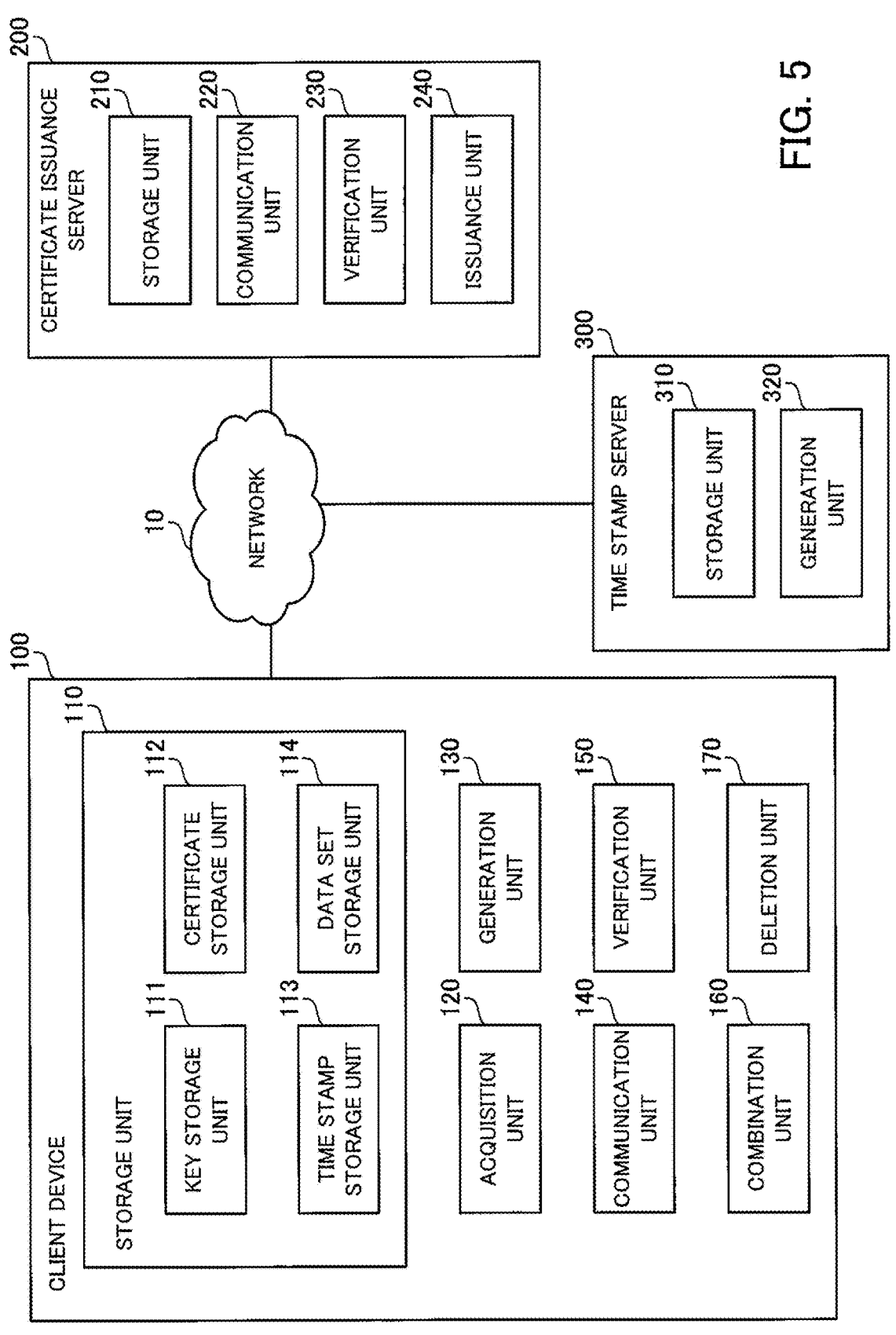
FIG. 5 is a diagram showing an issuance system in a second embodiment.

FIG. 5 is a diagram showing an issuance system in the second embodiment.

The client device 100 further includes a deletion unit 170. Part or the whole of the deletion unit 170 may be implemented by processing circuitry. Further, part or the whole of the deletion unit 170 may be implemented as modules of a program executed by the processor 101.

The deletion unit 170 reduces the number of time stamps stored in the time stamp storage unit 113. For example, the deletion unit 170 reduces the number of time stamps upon receiving a deletion command due to the user's input operation. Alternatively, the deletion unit 170 deletes a predetermined number of time stamps when the number of time stamps has exceeded a predetermined threshold value. Further, for example, the deletion unit 170 deletes all of the plurality of time stamps stored in the time stamp storage unit 113 except for a time stamp generated at the oldest time and a time stamp generated at the latest time. The number of time stamps is reduced as above.

In the step ST112, the communication unit 140 of the client device 100 transmits the CSR, the plurality of combinations (i.e., the plurality of sets) and all the time stamps stored in the time stamp storage unit 113 to the certificate issuance server 200. In other words, the communication unit 140 of the client device 100 transmits the CSR, all the sets stored in the data set storage unit 114 and all the time stamps stored in the time stamp storage unit 113 to the certificate issuance server 200.

In the step ST114, the verification unit 230 of the certificate issuance server 200 verifies the signatures. When there exists no time stamp corresponding to a signature, the process of verifying the term of validity of the client certificate is skipped.

Further, in the verification of the time stamps, the verification unit 230 may exclude time stamps far beyond the term of validity from the targets of the verification.

According to the second embodiment, the number of time stamps is reduced. Therefore, the data transmission traffic to the certificate issuance server 200 is reduced. Further, the load of the verification process of the time stamp on the certificate issuance server 200 is reduced.

Features in the embodiments described above can be appropriately combined with each other.

Further, the above description has been given of the cases where the client certificate is issued. The first and second embodiments are applicable to cases where a server certificate is issued. In the cases where a server certificate is issued, the client device 100 is replaced with a server. This server is referred to also as an information processing device.

DESCRIPTION OF REFERENCE CHARACTERS

10: network, 100: client device, 101: processor, 102: volatile storage device, 103: nonvolatile storage device, 110: storage unit, 111: key storage unit, 112: certificate storage unit, 113: time stamp storage unit, 114: data set storage unit, 120: acquisition unit, 130: generation unit, 140: communication unit, 150: verification unit, 160: combination unit, 170: deletion unit, 200: certificate issuance server, 210: storage unit, 220: communication unit, 230: verification unit, 240: issuance unit, 300: time stamp server, 310: storage unit, 320: generation unit

What is claimed is:

1. An issuance system comprising:
an information processing device that communicates with a time stamp server and stores an electronic certificate, a secret key having a relationship with the electronic certificate, and a preshared key; and
a certificate issuance server that stores the preshared key, wherein
the information processing device
generates a signature based on the secret key and the preshared key in a term of validity of the electronic certificate, transmits a command for generating a time stamp to the time stamp server, and receives the time stamp from the time stamp server, and
transmits the signature and the time stamp to the certificate issuance server after expiration of the term of validity, and the certificate issuance server
verifies the signature by using a public key corresponding to the secret key and verifies the time stamp, and
when it is certified that the preshared key had been stored in the information processing device and it is certified that the signature was generated in the term of validity, issues an electronic certificate and transmits the issued electronic certificate to the information processing device.

2. The issuance system according to claim 1, wherein the information processing device deletes the preshared key after the signature is generated.

3. The issuance system according to claim 1, wherein the information processing device
after the signature is generated, repeats the generation of a signature based on the secret key and data, transmits the time stamp generation command to the time stamp server each time the signature is generated, and thereby receives a plurality of time stamps,
reduces a number of time stamps, and
after the expiration of the term of validity, transmits all the generated signatures, the data used for generating the signatures, and all the time stamps stored in the information processing device to the certificate issuance server.

4. A certificate issuance server that communicates with an information processing device storing an electronic certificate, a secret key having a relationship with the electronic certificate, and a preshared key, the certificate issuance server comprising:

memory to store the preshared key;

communicating circuitry to receive a signature and a time stamp transmitted by the information processing device;

verifying circuitry to verify the signature by using a public key corresponding to the secret key and verify the time stamp; and issuing circuitry to issue an electronic certificate when it is certified that the preshared key had been stored in the information processing device and it is certified that the signature was generated in a term of validity of the electronic certificate, wherein the signature is generated in the term of validity based on the secret key and the preshared key, the time stamp is information certifying timing of the generation of the signature, and upon issuance of the electronic certificate, the communicating circuitry transmits the issued electronic certificate to the information processing device.

5. The issuance system according to claim 2, wherein the information processing device after the signature is generated, repeats the generation of a signature based on the secret key and data, transmits the time stamp generation command to the time stamp server each time the signature is generated, and thereby receives a plurality of time stamps, reduces a number of time stamps, and after the expiration of the term of validity, transmits all the generated signatures, the data used for generating the signatures, and all the time stamps stored in the information processing device to the certificate issuance server.

* * * * *